(12) United States Patent
Kasahara et al.

(10) Patent No.: US 8,039,143 B2
(45) Date of Patent: Oct. 18, 2011

(54) ELECTRODE UNIT FOR PRISMATIC BATTERY, PRISMATIC BATTERY, AND METHOD OF MANUFACTURING ELECTRODE UNIT FOR PRISMATIC BATTERY

(75) Inventors: Hideki Kasahara, Kosai (JP); Kiyoshi Hayashi, Kosai (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 719 days.

(21) Appl. No.: 11/552,695

(22) Filed: Oct. 25, 2006

(65) Prior Publication Data

US 2007/0092792 A1    Apr. 26, 2007

(30) Foreign Application Priority Data

Oct. 26, 2005    (JP) ................................. 2005-310791
Dec. 26, 2005    (JP) ................................. 2005-373599
Aug. 4, 2006     (JP) ................................. 2006-213138

(51) Int. Cl.
*H01M 2/26* (2006.01)

(52) U.S. Cl. ........ 429/161; 429/152; 429/160; 429/178; 429/179; 429/209; 429/210; 429/211

(58) Field of Classification Search ................. 429/161, 429/152, 160, 178–179, 209–211
See application file for complete search history.

(56) References Cited

U.S. PATENT DOCUMENTS

| | | | | |
|---|---|---|---|---|
| 6,413,668 B1 * | 7/2002 | Sandberg et al. | ............. | 429/174 |
| 7,501,203 B2 * | 3/2009 | Shimamura et al. | .......... | 429/179 |
| 2003/0113621 A1 * | 6/2003 | Shimamura et al. | .......... | 429/179 |
| 2003/0215706 A1 * | 11/2003 | Alunans et al. | ............... | 429/161 |
| 2004/0009403 A1 * | 1/2004 | Kim et al. | ..................... | 429/247 |
| 2004/0121228 A1 * | 6/2004 | Ovshinsky et al. | ........... | 429/131 |

* cited by examiner

*Primary Examiner* — Ula C. Ruddock
*Assistant Examiner* — Patricia Davis
(74) *Attorney, Agent, or Firm* — Oblon, Spivak, McClelland, Maier & Neustadt, L.L.P.

(57) ABSTRACT

To provide an electrode unit for a prismatic battery capable of increasing the output of the battery while suppressing the battery internal resistance value and improving the degree of freedom of the size of the electrode plate. An electrode unit for a prismatic battery including an electrode group in which positive electrode plates and negative electrode plates in an almost rectangular shape are alternately stacked with separators interposed therebetween. In each of the positive electrode plate and the negative electrode plate, core material exposed portions are formed at least on two side edges. The positive electrode plates and the negative electrode plate are stacked such that their core material exposed portions are directed not to overlap each other in the stack direction. The electrode unit for a prismatic battery includes a positive current collector having a shape capable of joining to all of the core material exposed portions of the positive electrode plates constituting the electrode group, and a negative current collector capable of joining to all of the core material exposed portions of the negative electrode plates constituting the electrode group, not in contact with the positive current collector.

13 Claims, 10 Drawing Sheets

ELECTRODE UNIT FOR PRISMATIC BATTERY, PRISMATIC BATTERY, AND METHOD OF MANUFACTURING ELECTRODE UNIT FOR PRISMATIC BATTERY

BACKGROUND OF THE INVENTION

1. Field of the Invention

The present invention relates to an electrode unit for a prismatic battery including an electrode group formed comprising positive electrode plates, negative electrode plates, and separators, a prismatic battery, and a method of manufacturing an electrode unit for a prismatic battery.

2. Description of the Related Art

In recent years, portable information devices such as a cellular phone, note book-sized personal computer and so on have become widespread. Those devices aim for higher performance, reduced weight, and miniaturization. Accordingly, the secondary battery for use in the power supply of the portable information devices is required to have reduced size and weight and increased energy density.

On the other hand, for external environment such as considerations to rise in gasoline price and global warming, expectations are raised for an electric vehicle. Besides, a so-called hybrid electric vehicle which uses a gasoline engine and an electric motor as a power source is also commercially available.

It is needless to say that the secondary battery is used as a power supply for the electric vehicle and hybrid electric vehicle. In addition, the secondary battery is required to have reduced size and weight, increased energy density and output, longer life, lower cost, improved reliability and so on.

The portable information device, electric vehicle, or hybrid electric vehicle has limited space to house the secondary battery.

On the other hand, the conventional secondary battery often has a cylindrical shape and thus undesirably creates a gap when it is housed in the limited space.

Hence, in place of the cylindrical battery, a prismatic battery has become mainstream. Typical technologies relating to a prismatic battery include, for example, those described in Patent Document 1 and Patent Document 2.

Patent Document 1 describes a technology in which "a positive electrode plate and a negative electrode plate are stacked with a separator interposed therebetween such that their side edge portions on the opposite sides protrude from opposed portions of both the electrode plates so that the protruding portions are made lead portions to reduce the average distance from the entire surfaces of the electrode plates to the current collectors. Thus, the battery internal resistance value is reduced and the utilization rate of the electrode active material is increased to improve the battery output."

Besides, Patent Document 2 describes a technology in which "electrode plate end portions are provided on the side surfaces of a battery, and the electrode plate tabs are welded to current collecting terminals in a plate shape to realize a ratio of electrode plate width dimension to electrode plate height dimension of 0.22 to 0.67."

According to Patent Document 2, the distance to the electrode plate end portion can be reduced to improve the current collection efficiency. In the case of employment of this technology in a prismatic alkaline storage battery, an effect capable of reducing the loss of current in high-rate discharge is provided.

[Patent Document 1] Japanese Patent Application Laid-open No. 2001-93508
[Patent Document 2] Japanese Patent Application Laid-open No. 2001-196091

SUMMARY OF THE INVENTION

Incidentally, for the prismatic battery proposed in the above-described Patent Document 1 (Japanese Patent Application Laid-open No. 2001-93508), a technology is also described in which $L>D$ and $L \leqq 4D$ are established where the length of the side provided at the lead portion is L and the length of the side perpendicular to that is D." In other words, a problem of the technology is that the current collection ability by the current collector joined to one end surface of the electrode plate decreases with an increase in the length D of the side perpendicular to the side provided at the lead portion, with the result that "the effect of reducing the battery internal resistance" is reduced.

A problem of the technology described in Patent Document 2 is that the current collection ability by the current collector joined to one end surface of the electrode plate also decreases when the ratio of electrode plate width dimension to electrode plate height dimension is 0.67 or more, with the result that "the effect of reducing the battery internal resistance" is reduced.

The present invention has been developed in consideration of the above points, and provides an electrode unit for a prismatic battery, a prismatic battery, and a method of manufacturing an electrode unit for a prismatic battery each capable of increasing the output of the battery while suppressing the battery internal resistance value and improving the degree of freedom of the size of the electrode plate.

The present invention discloses the following inventions as means to solve the above problems.

The electrode unit for a prismatic battery of the present invention relates to an electrode unit for a prismatic battery including an electrode group in which positive electrode plates and negative electrode plates in an almost rectangular shape are alternately stacked with separators interposed therebetween.

More specifically, the electrode unit is characterized in that core material exposed portions are formed at least on two side edges in each of the positive electrode plates and negative electrode plates, and the positive electrode plates and negative electrode plate are stacked such that the core material exposed portions thereof are directed not to overlap each other in the stack direction, the electrode unit further including a positive current collector having a shape capable of joining to the core material exposed portions of the positive electrode plates, and a negative current collector capable of joining to the core material exposed portions of the negative electrode plates, not in contact with the positive current collector.

In general, some regions of the positive electrode plate or the negative electrode plate being far from the current collector cause a reduction in the current collection effect.

The positive current collector according to the present invention is in contact with the core material exposed portions of all of the positive electrode plates, and the negative current collector is in contact with the core material exposed portions of all of the negative electrode plates. Further, the core material exposed portions are located at least on two side edges in each of the positive electrode plates and the negative electrode plates. Accordingly, the present invention has a structure such that the distance from every region of the positive electrode plates and the negative electrode plates to the current collectors is not long. Therefore, the structure causes less reduction in the current collection effect. As a result, the battery internal resistance value can also be suppressed to a small value, contributing to improvement in the output of the battery.

Besides, the ratio between the vertical and horizontal dimensions of the positive electrode plate and the negative electrode plate is freely set as long as a condition that the positive electrode plates and the negative electrode plates can be stacked such that the respective core material exposed portions protrude while not overlapping each other is satisfied. Accordingly, the degree of freedom in designing the outer peripheral shape of the battery is increased.

It is desired the electrode group is fixed by fixing the positive current collector to the core material exposed portions of the positive electrode plates, and fixing the negative current collector to the core material exposed portions of the negative electrode plates.

Fixation of the positive current collector and the negative current collector to the respective core material exposed portions realizes the fixation of the electrode group formed by stacking the positive electrode plates and the negative electrode plates. This can simplify the configuration of the electrode unit for a prismatic battery.

Further, the electrode unit for a prismatic battery of the present invention is characterized in that the core material exposed portions formed in each of the positive electrode plates and the negative electrode plates are formed on two side edges along a pair of opposite sides on each of the positive electrode plates and the negative electrode plates.

Further, the electrode unit for a prismatic battery of the present invention is characterized in that the core material exposed portions formed in each of the positive electrode plates and the negative electrode plates are formed on two adjacent side edges on each of the positive electrode plates and the negative electrode plates.

Further, in the electrode unit for a prismatic battery of the present invention, the core material exposed portions formed in each of the positive electrode plates and the negative electrode plates are formed on three adjacent side edges on each of the positive electrode plates and the negative electrode plates. Further, the electrode unit is characterized in that lengths of the core material exposed portions formed on two side edges located on opposite sides of the three side edges are shorter than respective entire lengths of the two side edges.

Further, in the electrode unit for a prismatic battery of the present invention, the positive current collector and the negative current collector have shapes along the side edges including the core material exposed portions.

Furthermore, the electrode unit is characterized in that connecting terminal portions protrude from edges or corners of the positive current collector and the negative current collector.

The connecting terminal portions are for connection to an external connecting device employing, as a power supply, the electrode unit for a prismatic battery of the present invention. The connecting terminal portions can be protruded from the edges or corners of the positive current collector and the negative current collector, and thereby easily adapt to the positional relation of the connecting terminal portions determined by the external connecting device.

Further, the electrode unit for a prismatic battery of the present invention is characterized in that the positive electrode plates and the negative electrode plates are stacked such that the two side edges of the positive electrode plate where the core material exposed portions are formed and the two side edges of the negative electrode plate where the core material exposed portions are formed are arranged in directions to form right angles with each other.

Further, in the electrode unit for a prismatic battery of the present invention, both of the positive current collector and the negative current collector are formed having a cross section in a C-shape. Furthermore, the electrode unit is characterized in that two opposite side plate portions of the positive current collector are joined to a pair of core material exposed portions of each of the positive electrode plates, and two opposite side plate portions of the negative current collector are joined to a pair of core material exposed portions of each of the negative electrode plates.

Further, the electrode unit for a prismatic battery of the present invention is characterized in that the positive current collector and the negative current collector are joined to respective core material exposed portions by any of laser beam welding, electron beam welding or resistance heating welding.

Further, the electrode unit for a prismatic battery of the present invention is characterized in that an active material of the positive electrode plate contains nickel hydroxide as a main component, and an active material of the negative electrode plate contains a hydrogen absorbing alloy as a main component.

In other words, the electrode unit is an electrode unit for a prismatic battery for a nickel-metal hydride battery.

Further, the electrode unit for a prismatic battery of the present invention is characterized in that an active material of the positive electrode plate contains a lithium-containing metal compound as a main component, and an active material of the negative electrode plate contains a carbon material as a main component.

In other words, the electrode unit is an electrode unit for a prismatic battery for a lithium ion battery.

Further, the present invention also provides a prismatic battery using the electrode unit for a prismatic battery.

More specifically, the present invention is a prismatic battery characterized by including the electrode unit for a prismatic battery, a casing for housing the electrode unit for a prismatic battery; a positive electrode terminal electrically connected to a positive current collector of the electrode unit for a prismatic battery and attached to the casing, and a negative electrode terminal electrically connected to a negative current collector of the electrode unit for a prismatic battery and attached to the casing.

Further, the present invention also provides a method of manufacturing the electrode unit for a prismatic battery.

More specifically the present invention is a method of manufacturing an electrode unit for a prismatic battery, including:

an active material filling step of filling active materials in a positive electrode core material forming a positive electrode plate and a negative electrode core material forming a negative electrode plate;

a core material exposed portion forming step of forming core material exposed portions at least on two side edges in each of the positive electrode plate and the negative electrode plate fabricated in an almost rectangular shape;

a rolling step of rolling the positive electrode plate and the negative electrode plate into a predetermined thickness;

a stacking step of stacking the positive electrode plates and the negative electrode plates with separators interposed therebetween such that the respective core material exposed portions are directed not to overlap each other in the stack direction and the respective active material filled portions are opposed to each other;

a positive current collector joining step of joining, to the core material exposed portions, a positive current collector formed in a shape in contact with all of the core material exposed portions located on both ends in the positive electrode plates; and a negative current collector joining step of joining, to the core material exposed portions, a negative current collector formed in a shape in contact with all of the core material exposed portions located on both ends in the negative electrode plates but not in contact with the positive current collector.

It is preferable that in the core material exposed portion forming step, the core material exposed portion is formed by an ultrasonic removing method or stripping method.

Further, it is preferable that the positive current collector and the core material exposed portions corresponding thereto are joined in the positive current collector joining step, and the negative current collector and the core material exposed portions corresponding thereto are joined in the negative current collector joining step, by any of laser beam welding, electron beam welding or resistance heating welding.

Effect of the Invention

According to the present invention, a reduction in the current collection effect hardly occurs even in regions near the centers of both electrode plates because the regions are close to the core material exposed portions, that is, the respective current collectors. As a result, the present invention can also suppress the battery internal resistance value to a small value, contributing to improvement in the output of the battery. In addition, the present invention also contributes to improvement in the degree of freedom of the size of the positive electrode plate and the negative electrode plate.

Further, the present invention can improve the degree of freedom about the outer shape in conjunction with the improvement in the degree of freedom of the size of the positive electrode plate and the negative electrode plate.

DETAILED DESCRIPTION OF THE PREFERRED EMBODIMENT(S)

Embodiments of the present invention will be described with reference to the drawings taking a nickel-metal hydride battery as an example.

Figure 1:
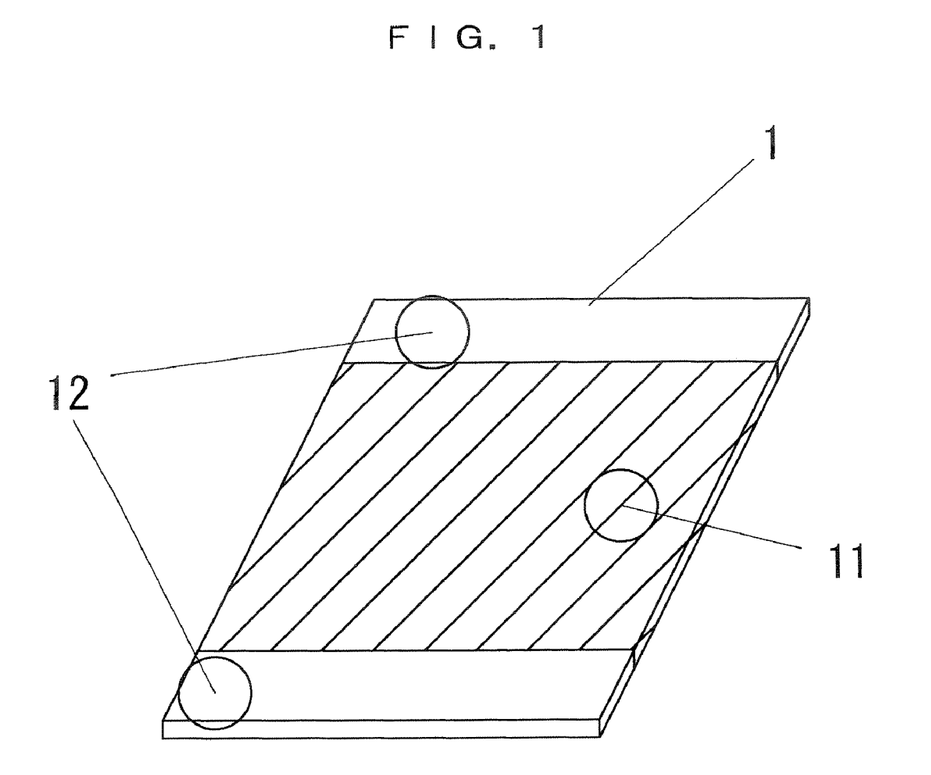
FIG. 1 is a perspective view of a positive electrode plate for constituting an electrode group of a prismatic battery.
Figure 2:
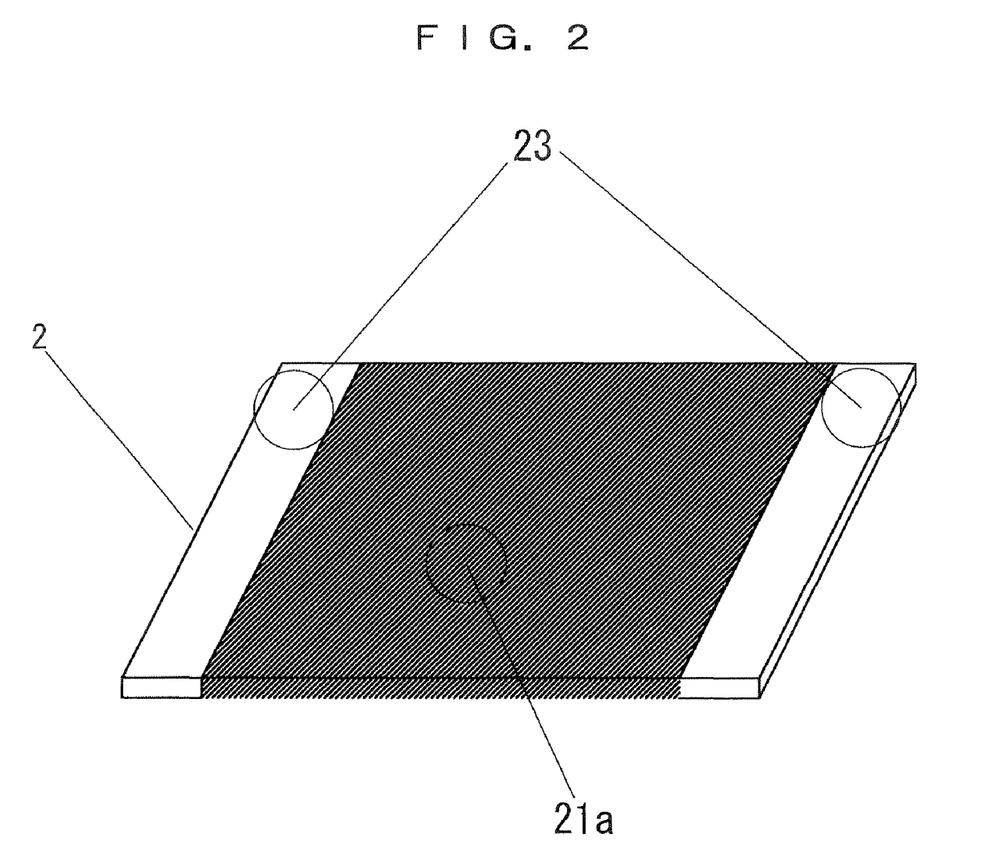
FIG. 2 is a perspective view of a negative electrode plate for constituting the electrode group of the prismatic battery.
Figure 3:
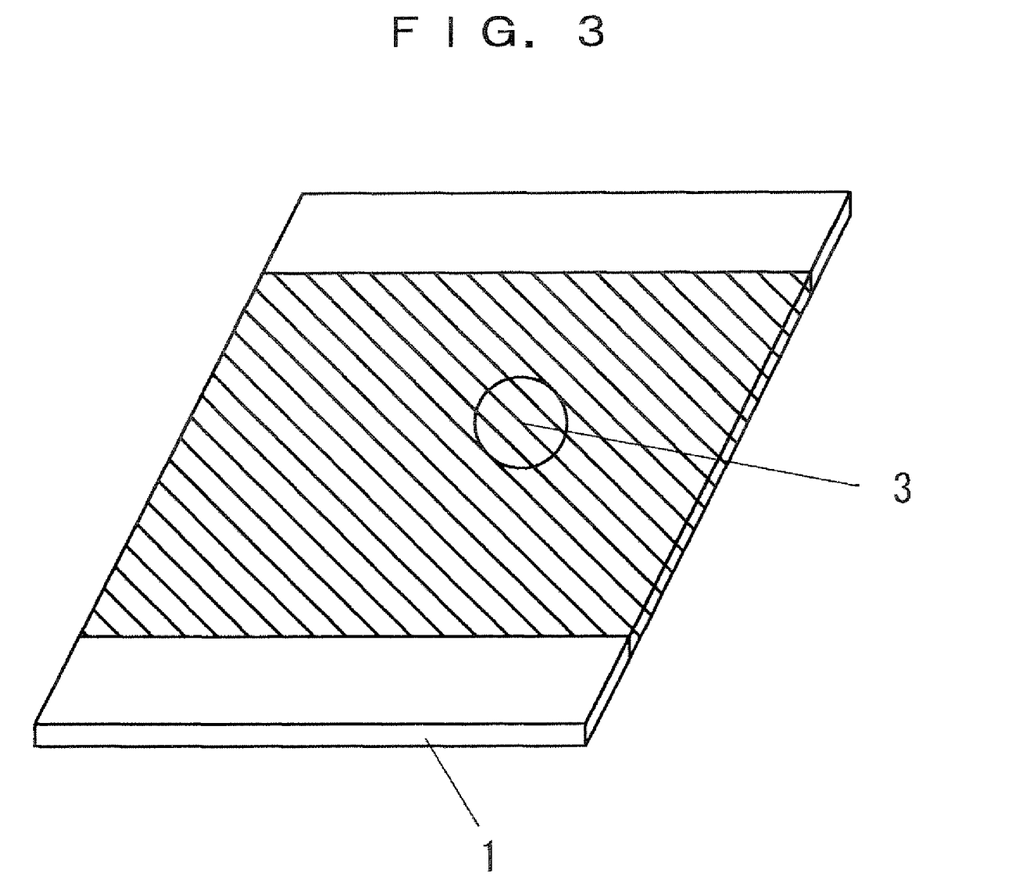
FIG. 3 is a perspective view of a separator for constituting the electrode group of the prismatic battery.
Figure 4:
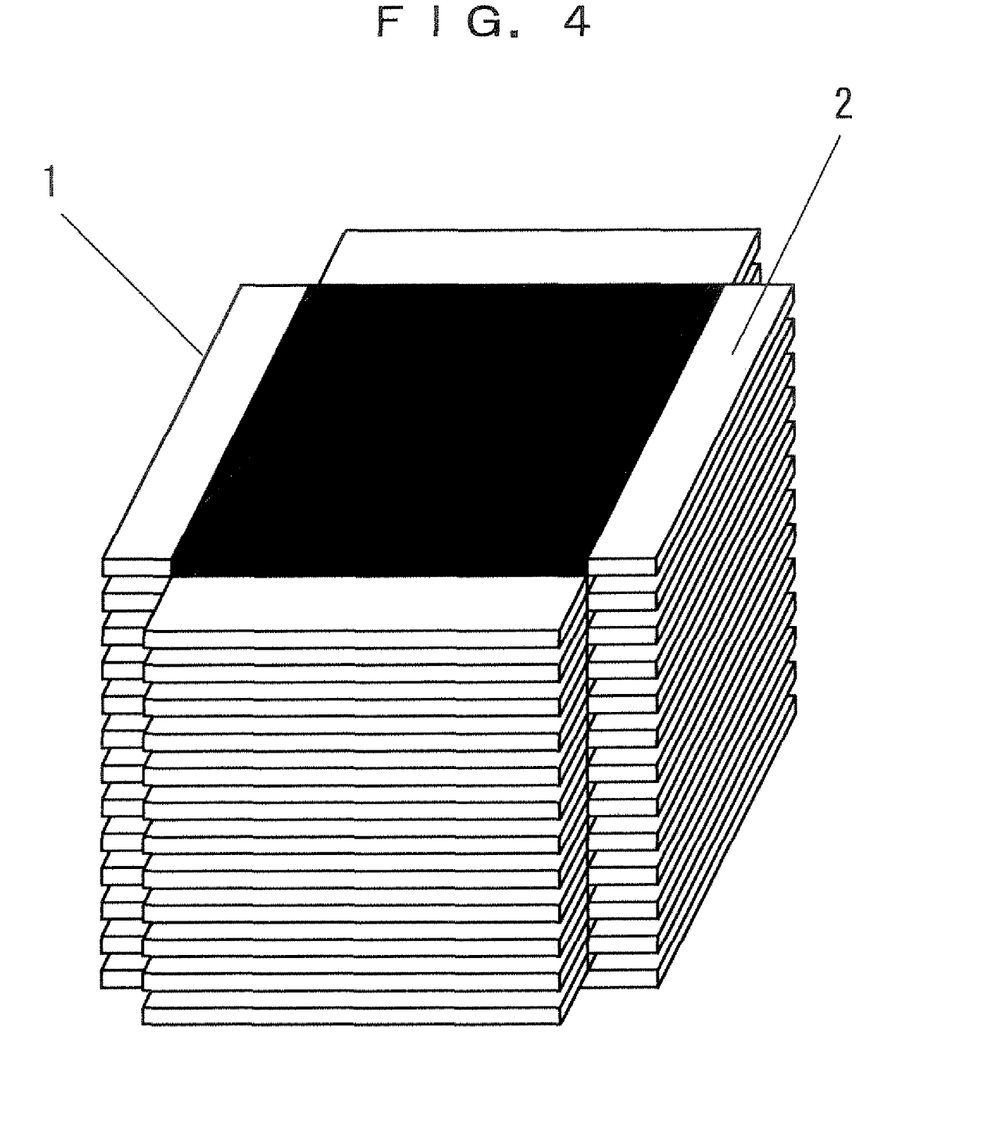
FIG. 4 is a perspective view when the positive electrode plates and the negative electrode plates are stacked.
Figure 5:
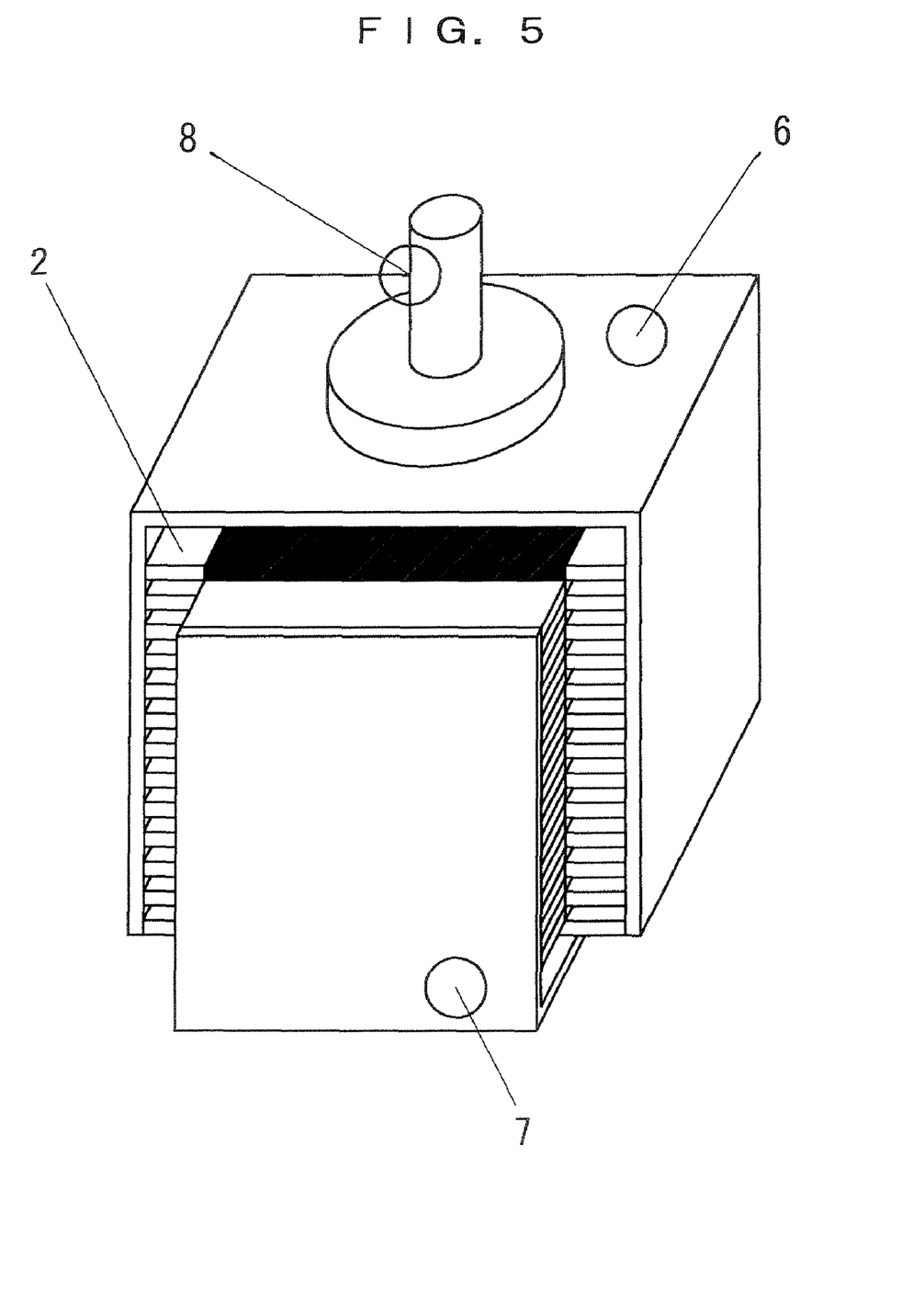
FIG. 5 is a perspective view when the positive electrode plates and the negative electrode plates are stacked and current collectors are fixed to them.

FIG. 1 to FIGS. 9A and 9B will be used here. FIG. 1 to FIG. 3 are perspective views of a positive electrode plate, a negative electrode plate, and a separator for use in a prismatic sealed secondary battery as a prismatic battery, which constitute an electrode unit for a prismatic battery of the present invention. Further, FIG. 4 and FIG. 5 are perspective views showing an appearance in which the positive electrode plates, negative electrode plates and separators are stacked and a current collector is not fixed yet and an appearance in which they are stacked and the current collector is already fixed, respectively.

First Embodiment

As shown in FIG. 1, a positive electrode plate 1 is formed in an almost rectangular plate-shape and includes an active material filled portion 11 in which an active material containing nickel hydroxide as a main component is filled in a core material, and core material exposed portions 12 in which the active material is not filled formed at two opposite side edges.

A negative electrode plate 2 is formed from a porous metal plate (punching metal), as shown in FIG. 2, in an almost rectangular plate-shape and includes an active material filled portion 21a in which a paste containing, as a main component, fine particles of a hydrogen absorbing alloy being a negative electrode active material is applied to the porous metal plate, and core material exposed portions 23 in which the active material is not applied to the porous metal plate formed at two opposite side edges.

Note that the negative electrode active material is hydrogen in principle, but the hydrogen absorbing alloy being a main component of the negative electrode is referred to as an "active material" for convenience in the present application.

FIG. 3 shows a separator 3 wrapped around the above-described positive electrode plate 1 in a manner to cover the active material filled portion 11. The separator 3 can employ a nonwoven fabric made of a polypropylene resin which has been subjected to sulfonation or a polyamide resin.

FIG. 4 shows an appearance in which the above-described positive electrode plates 1 and the above-described negative electrode plates 2 are stacked with the separators 3 interposed therebetween such that their core material exposed portions 12 and 23 protrude while not overlapping each other and their active material filled portions face each other.

FIG. 5 shows an appearance in which a positive current collector 7 and a negative current collector 8 each having a cross-sectional shape in a U-shape are fixed to the stacked positive electrode plates 1 and the negative electrode plates 2, respectively.

The positive current collector 7 is fixed such that its inner side surfaces are in contact with all of the core material exposed portions 12 located on both ends of the positive electrode plates 1 respectively, and the negative current collector 6 is also fixed such that its inner side surfaces are in contact with all of the core material exposed portions 23 located on both ends of the negative electrode plates 2 respectively.

Means for joining the positive and negative current collectors 7 and 6 to the core material exposed portions 12 and 23 employs one of various kinds of welding. For example, the laser beam welding, electron beam welding or resistance heating method can be used.

At the center of the negative current collector 6, a negative electrode terminal 8 protruding outward is provided. Besides, at the center of the positive current collector 7, a positive electrode terminal 8 protruding outward is also provided though illustration thereof is omitted.

Though not shown, an electrode group as described above is housed in a predetermined casing to form a prismatic battery, and the electrode group formed as described above is in an almost rectangular parallelepiped shape that is a very rational shape for use in the prismatic battery.

In other words, since the electrode group is in an almost parallelepiped shape, the inner space of the casing in which the electrode group is housed can also be made in a rectangular parallelepiped shape. Therefore, a prismatic battery without wasted space can be formed.

Second Embodiment

Figure 6A:
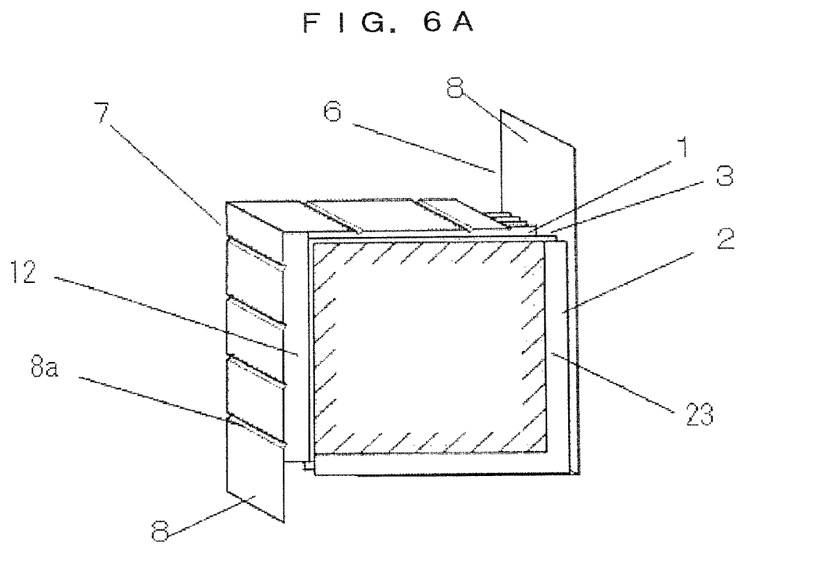
FIGS. 6A to 6C are views showing a second embodiment, with FIG. 6A being a perspective view, FIG. 6B being a front view of a positive electrode plate, and FIG. 6C being a front view of a negative electrode plate.
Figure 6B:
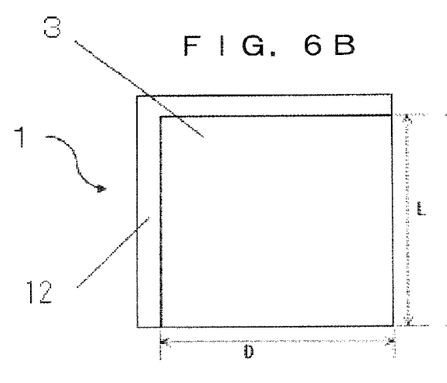
Figure 6C:
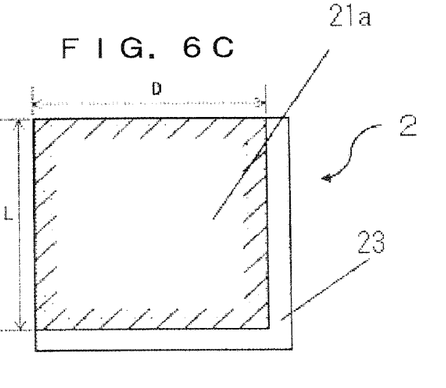

The different points between the first embodiment shown in FIG. 1 to FIG. 5 and a second embodiment shown in FIGS. 6A to 6C are as follows. Namely, the regions of the core material exposed portions 12 and 23 formed in the positive electrode plate 1 and the negative electrode plate 2 are not on the two side edges along a pair of opposite sides but on two side edges adjacent to each other.

As shown in FIG. 6B, a positive electrode plate 1 is provided with core material exposed portions 12 at two adjacent side edges in an inverted-L shape in the drawing. Further, the front and back both surfaces of the positive electrode plate 1 are covered with a separator 3 with the core material exposed portions 12 protruding.

As shown in FIG. 6C, a negative electrode plate 2 is provided with core material exposed portions 23 at two adjacent side edges in an L shape in the drawing opposed to the core material exposed portions 12 of the positive electrode plate 1. Further, the negative electrode plates 2 and the positive electrode plates 1 covered with the separators 3 are alternately stacked with the negative electrode plate 2 disposed on the outermost side and arranged such that their core material exposed portions 12 and 23 protrude at four sides to form an electrode group.

At the positive electrode plates 1 in this electrode group, abutting on the outside surfaces of the core material exposed portions 12 in an inverted-L shape in the drawing, a positive current collector 7 shown in a similar inverted-L shape is disposed. Similarly, at the negative electrode plates 2 in this electrode group, abutting on the outside surfaces of the core material exposed portions 23 in an inverted-L shape in the drawing, a negative current collector 6 shown in a similar inverted-L shape is disposed. Further, the current collectors 7 and 6 are provided with joint portions 8a along the width direction at every predetermined interval (illustration of joint portions 8a on the negative current collector 6 side is omitted).

The joint portions 8a protrude toward the core material exposed portions 12 and 23 made by attaching a brazing material thereto or folding the current collectors 7 and 6 themselves. The joint portions 8a may be folded in advance or may eventually fold at the time of welding depending on the welding method.

The joint portions 8a and the core material exposed portions 12 and 23, in sure contact with each other, are joined by the laser beam welding, electron beam welding or resistance heating welding method. More specifically, the electrode group is fixed by the current collectors 7 and 6. The current collectors 7 and 6 have ends at positions corresponding to opposite corners extended to the outside of the electrode group, and the extended regions are terminals 8 for connection.

The above-described electrode unit for a prismatic battery is manufactured through a step of filling active materials in core materials of the positive electrode plate 1 and the negative electrode plate 2, a step of forming core material exposed portions at two edge sides of the positive electrode plate 1 and the negative electrode plate 2, a step of rolling the positive electrode plate 1 and the negative electrode plate 2 to a predetermined thickness, a step of stacking the positive electrode plates 1 and the negative electrode plates 2 with the separators 3 interposed therebetween with the core material exposed portions 12 and 23 protruding to constitute an electrode group, and a step of joining the current collectors 7 and 6 for the positive electrode plates 1 and the negative electrode plates 2 matching the side edges comprising the core material exposed portions 12 and 23 to the respective core material exposed portions 12 and 23.

The electrode unit for a prismatic battery according to this embodiment can exhibit its maximum current ability irrespective of the aspect ratios of the positive electrode plate 1 and the negative electrode plate 2 (the ratios between D and L shown in FIGS. 6B and 6C). This is because the above structure can prevent increase in average resistance value from any portions in the positive electrode plate 1 and the negative electrode plate 2 to the current collectors 7 and 6. As a result, the structure can decrease the internal resistance of the battery and contribute to improvement in output of the battery.

Besides, the core material exposed portions 12 and 23 of the positive electrode plates 1 and the negative electrode plates 2 forming the electrode group are fixed to the respective current collectors 7 and 6 to thereby fix the electrode group. Therefore, the fixation of the current collectors 7 and 6 to the core material exposed portions 12 and 23 also realizes the fixation of the electrode group formed by stacking the positive electrode plates 1 and the negative electrode plates 2, so that the electrode unit for a prismatic battery can be made in a simple configuration.

Third Embodiment

Figure 7A:
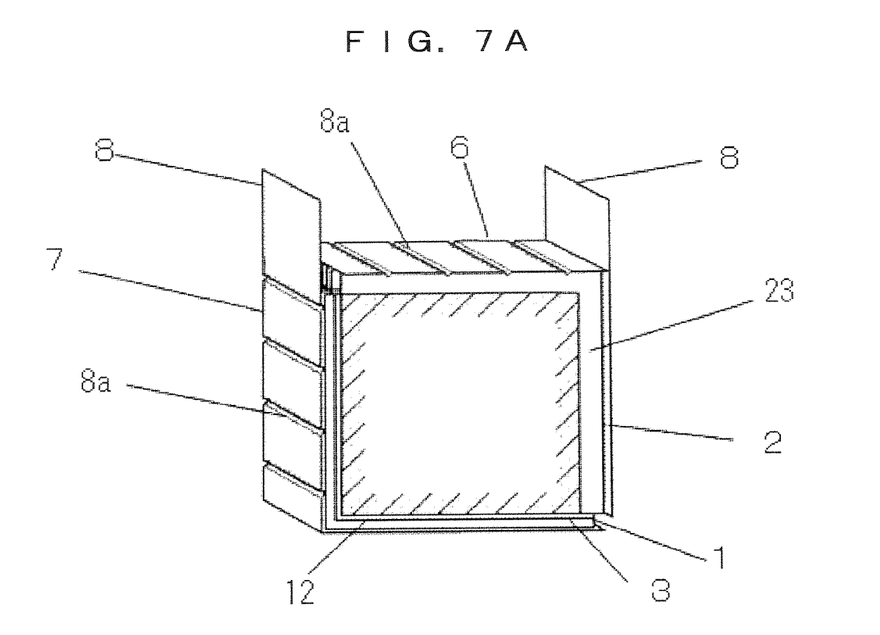
FIGS. 7A to 7C are views showing a third embodiment, with FIG. 7A being a perspective view, FIG. 7B being a front view of a positive electrode plate, and FIG. 7C being a front view of a negative electrode plate.
Figure 7B:
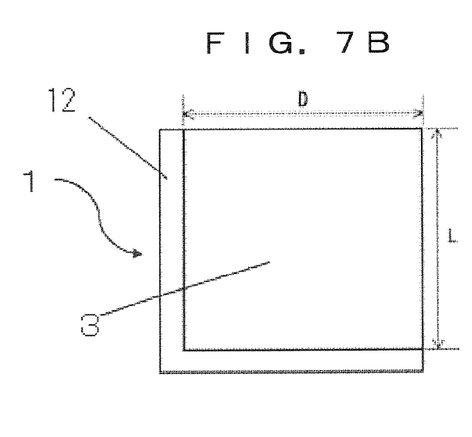
Figure 7C:
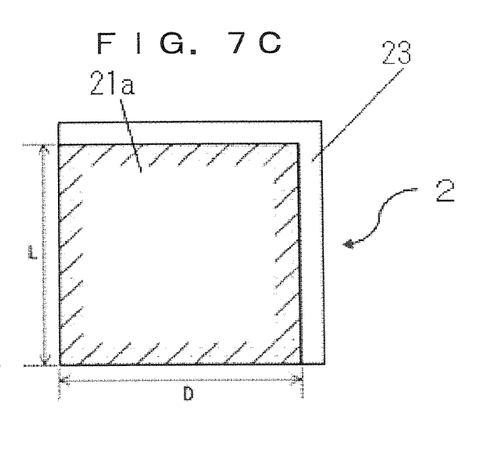

FIGS. 7A to 7C show a third embodiment. The point of the third embodiment different from the second embodiment shown in FIGS. 6A to 6C is that the terminals 8 and 8 for connection extended from the current collectors 7 and 6 are located at face-to-face positions. This embodiment is suitable for the case in which an external connection structure connected to the electrode unit for a prismatic battery according to this embodiment (an external connection device using an electrode unit for a prismatic battery as the power supply) requires the positive electrode and negative terminals facing each other.

Also in this case, the maximum current ability can be exhibited irrespective of the aspect ratios of the positive electrode plate 1 and the negative electrode plate 2 (the ratios between D and L shown in FIGS. 7B and 7C).

Forth Embodiment

A fourth embodiment will be described using FIGS. 8A to 8C.

A positive electrode plate 1 and a negative electrode plate 2 for use in this embodiment include core material exposed portions 12 and 23 forming a C-shape over one entire side edge and extending to halves of two side edges adjacent to the one side edge. A positive current collector 7 and a negative current collector 6 have cross-sectional shapes in the same C-shapes as those of the core material exposed portions 12 and 23, and are abutted on and joined to the outside surfaces of the core material exposed portions 12 and 23. Further, terminals 8 and 8 for connection extended from the positive current collector 7 and the negative current collector 6 are closely located facing each other.

Figure 8A:
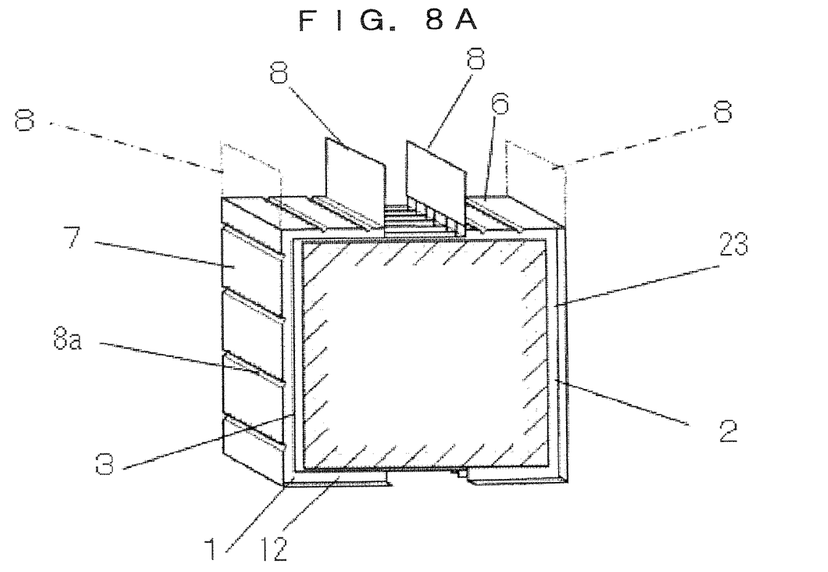
FIGS. 8A to 8C are views showing a fourth embodiment, with FIG. 8A being a perspective view, FIG. 8B being a front view of a positive electrode plate, and FIG. 8C being a front view of a negative electrode plate.
Figure 8B:
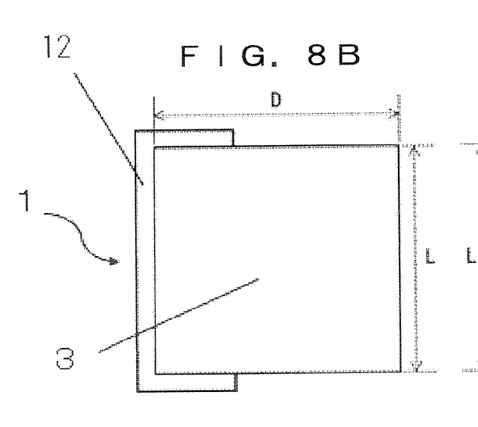
Figure 8C:
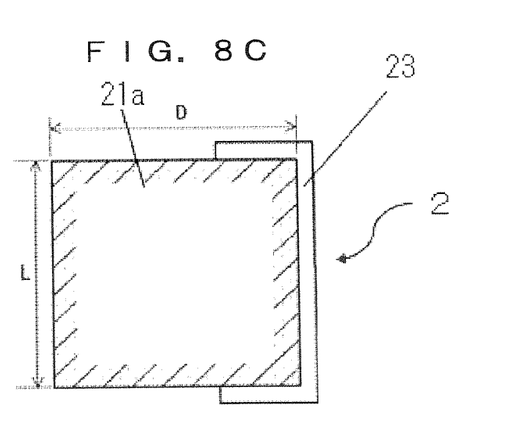

As shown by imaginary lines (two-dotted broken lines) in FIGS. 8A to 8C, the terminals 8 and 8 may be positioned not close to each other but parallel to each other extending from corners of the current collectors 7 and 6. For example, this embodiment is adaptable for the case in which the external connection structure connected to the electrode unit for a prismatic battery according to this embodiment requires the positive electrode and negative electrode terminals having a wide space therebetween.

Fifth Embodiment

Figure 9A:
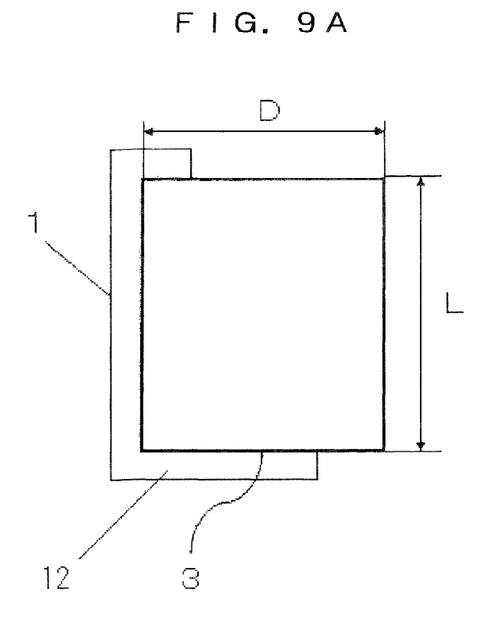
FIGS. 9A and 9B are views showing a fifth embodiment, with FIG. 9A being a front view of a positive electrode plate, and FIG. 9B being a front view of a negative electrode plate.
Figure 9B:
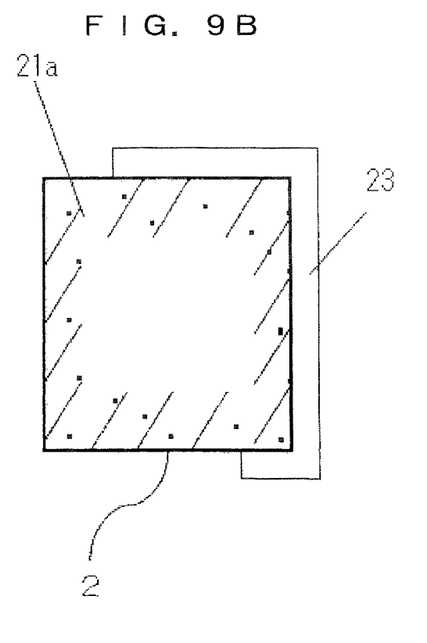

FIGS. 9A and 9B show a fifth embodiment. The fifth embodiment is a modified example of the fourth embodiment. More specifically, in the core material exposed portions 12 and 23 each forming a C-shape, lengths of opposite sides of the C-shape are made different. To adapt to the arrangement of the terminals required by the external connection structure connected to the electrode unit for a prismatic battery according to this embodiment, the current collectors may be prepared which have cross-section shapes matching the core material exposed portions 12 and 23.

Note that in order to prevent a reduction in current collection effect being the effect of the present invention in the fifth embodiment, it is desired that the ratio between horizontal and vertical dimensions of the positive electrode plate 1 and the negative electrode plate 2 is L>D. This is for the reason proposed in Patent Document 1 (Japanese Patent Application Laid-open No. 2001-93508).

Example 1

Example 1 described hereinafter corresponds to the first embodiment.

The positive electrode plate 1 for test was made using an active material and a substrate as a support member supporting the active material as in the following manner.

As the support member, a sponged nickel foam (with a porosity of 95%) of weight (area density) of 400 g/m$^2$ is employed. Then, the support member is filled with an active material made of spherical powder of nickel hydroxide in a paste form to form the positive electrode plate 1. The paste is formed by mixing 100 wt % of spherical nickel hydroxide powder containing cobalt and zinc in a solid solution state with a predetermined amount of cobalt compound and water.

After filling, the resulting positive electrode plate is dried, rolled, and cut into predetermined dimensions to form a nickel positive electrode plate having a theoretical capacitance of 650 mAh per plate.

The predetermined dimensions include a thickness of the filled portion of 0.46 mm, a width of the filled portion of 50 mm, and a length L of the filled portion of 50 mm.

The core material exposed portion 12 to which the positive current collector 7 is joined is fabricated by peeling off the active material by the ultrasonic removing method after rolling, and seam-welding a nickel-lead plate with the same width of the peeled-off active material.

The negative electrode plate 2 for test was made using an active material and a substrate as a support member supporting the active material as in the following manner.

As the support member, a punching metal core material with a thickness of 60 μm that is nickel plated iron is employed, and as the active material, a paste mainly composed of a hydrogen absorbing alloy (MmNi$_{3.6}$Co$_{0.7}$Mn$_{0.4}$Al$_{0.3}$, Mm: misch metal) is employed. Then paste is then applied to the support member, and the resulting support member is rolled and cut into predetermined dimensions to form the negative electrode plate 2.

The predetermined dimensions include a thickness of the filled portion of 0.30 mm, a width of the filled portion of 50 mm, and a length L of the filled portion of 50 mm. One plate has a capacitance of 850 mAh.

The region of the punching metal core material within predetermined dimensions (for example, 5 mm×5 mm) from both end portions in the width direction is made a plane portion where no punched holes are provided. The core material exposed portion 23 to which the negative current collector 6 is joined is formed on the plane portion. Therefore, the paste of hydrogen absorbing alloy applied on the entire surface is removed from the plane portion with a metal brush to make the core material exposed portion 23.

The separator 3 employs nonwoven fabric made of polypropylene which has been subjected to sulfonation. The weight is 70 g/m$^2$ and the thickness is 0.2 mm.

Twelve positive electrode plates 1 and thirteen negative electrode plates 2 are alternately stacked with the separators 3 interposed between the positive electrode plates 1 and the negative electrode plates 2 such that their respective core material exposed portions 12 and 23 protrude. This is referred to as the "electrode group."

The joint of the core material exposed portions 12 and 23 to the current collectors 7 and 6 each having a cross-sectional shape in a C-shape is performed as follows.

First of all, a nickel brazing material is applied in advance to the regions of the current collectors 7 and 6 on which the core material exposed portions 12 and 23 will be abutted. Then, electron beams are applied from the opposite surface of the current collectors 7 and 6 to melt the nickel brazing material with the electrode group being pressed against to the current collectors 7 and 6 to thereby join them. This is referred to as an "electrode unit."

The electrode unit produced as described above is set in a resin battery case, and a predetermined amount of an electrolyte mainly composed of potassium hydroxide is injected into the case. A predetermined lid body is joined to the electrode unit into which the electrolyte has been injected to manufacture a prismatic sealed nickel-metal hydride battery.

Thus manufactured nickel-metal hydride battery is subjected to a charge/discharge, aging, activation cycle for initial activation.

For initial activation, the charge is performed at 650 mA for 15 hours, and the discharge is performed at 1300 mA for 4 hours.

After completion of the initial charge/discharge, aging was performed in a constant temperature room at 45 degrees Celsius for one week to further activate the battery.

The battery for which aging has been finished is repeatedly subjected to charge/discharge. This is called an activation cycle. One cycle that is the condition of the activation cycle includes charging the battery at a current value of 6500 mA to reach a 90% state of charge and, immediately after the charge, discharging the battery from 1.2 V at that time to 1.0 V. Note that the state of charge may be abbreviated to "SOC (State of Charge)" hereinafter.

This cycle was repeated 50 times to produce a prismatic sealed nickel-metal hydride battery for use in the following experiment.

Figure 10A:
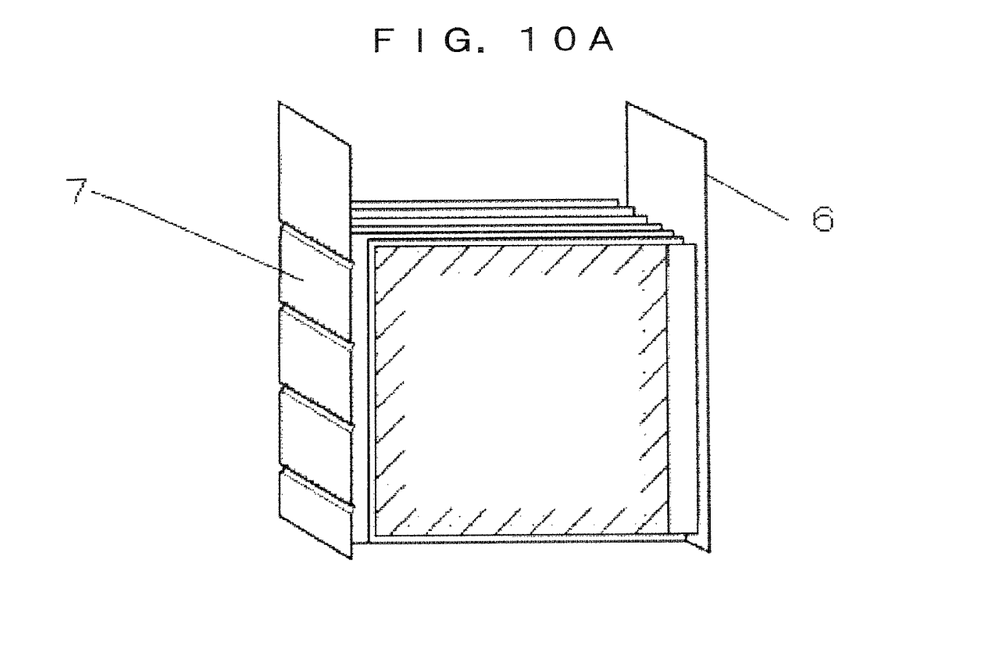
FIG. 10 is a front view showing an electrode group according to the prior art as Comparative Example.
Figure 10B:
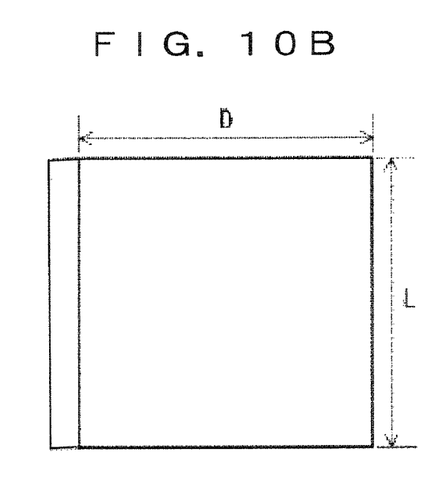
Figure 10C:
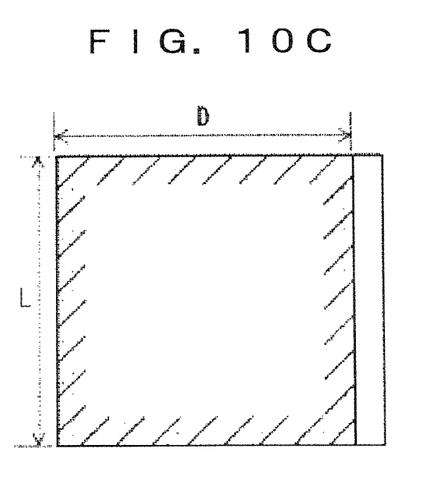

As a comparative object, a prismatic sealed nickel-metal hydride battery using the conventional electrode group shown in FIG. 10 is regarded as α (Comparative Example 1), and the above-described prismatic sealed nickel-metal hydride battery using the electrode group shown in FIG. 1 to FIG. 5 is regarded as β (Example 1), and their direct current internal resistances (hereinafter, abbreviated as "DC-IR") were measured.

The prismatic sealed nickel-metal hydride battery α taken as Comparative Example has current collectors 7 and 6 existing only in the vertical direction in FIG. 10.

The experimental conditions at this time are as follows.

First, each of the batteries was charged at a constant current into a 60% state of charge in an environment of 25° C., and discharge pulse and charge pulse were repeatedly applied thereto so that the voltage when ten seconds elapsed after application of each discharge pulse was measured, and the measurement value was plotted with respect to the current value.

Then, the least square method was applied to each of the plots to find an approximation straight line, and the value of inclination of the approximation straight line was regarded as DC-IR.

As a result of experiment carried out under the above-described conditions, the DC-IR of the battery α (Comparative Example 1) was 3.10 mΩ, and the DC-IR of the battery β (Example 1) was 2.90 mΩ. As a result of the above, it was found that the prismatic sealed nickel-metal hydride battery β (Example 1) according to the present invention could be reduced in the DC-IR value more than the prismatic sealed nickel-metal hydride battery α according to the prior art.

The conceivable reason why the DC-IR value could be reduced is that the current collection ability was increased by collecting current from the two opposite side edges on both the positive and negative electrode plates to reduce the average current collection distance with respect to the outer peripheral dimensions of the electrode plates in the electrode group according to the present invention.

While the welding by the electron beams was employed for joining the electrode group and the current collectors in the above-described examples, the similar result was obtained even by employing the resistance heating method or the laser welding.

While the nickel hydride battery was employed as the kind of the electrode group in the above-described example, the present invention can employ every kind of battery as long as it has the battery structure using the positive electrode plate, the negative electrode plate and the current collector.

Examples 2 to 4

Example 2, Example, 3 and Example, 4 correspond to the second embodiment, the third embodiment, and the fourth embodiment, respectively.

Fabrication of the positive electrode plate, the negative electrode plate, the separator, the electrode group, the electrode unit, and the prismatic sealed nickel-metal hydride battery is the same as that of Example 1. Further, the conditions of the charge/discharge, aging, activation cycle for initial activation for the assembled battery are also the same as those of Example 1.

The direct current internal resistances of the above-described Examples 2 to 4 and Comparative Example 1 were measured in the similar manner to Example 1 and Comparative Example 1.

More specifically, each of the batteries was charged at a constant current into a 60% SOC in an environment of 25° C., and discharge pulse and charge pulse were repeatedly applied thereto so that the voltage when ten seconds elapsed after application of each discharge pulse was measured, and the measurement value was plotted with respect to the current value.

Then, the least square method was applied to each of the plots to find an approximation straight line, and the value of inclination of the approximation straight line was regarded as DC-IR.

The results of the experiment carried out under the above-described conditions are shown in Table 1 for Examples 1 to 4 and Comparative Example 1.

TABLE 1

| Battery | DC-IR (mΩ) |
| --- | --- |
| Example 1 | 2.90 |
| Example 2 | 2.90 |
| Example 3 | 2.97 |
| Example 4 | 2.93 |
| Comparative Example 1 | 3.10 |

Table 1 shows that the direct current internal resistance is reduced also in Examples 2 to 4 as compared to Comparative Example 1. The conceivable reason for the reduction is that the ratio of the current collection range to the perimeter of the electrode plate was increased. More specifically, while the current is collected only from one side edge of the electrode plate in Comparative Example 1, the current is collected from two side edges or three side edges of the electrode plate in Examples 2 to 4.

While the nickel-metal hydride battery is exemplified in the above-described embodiments, the present invention can also be used in the manufacturing method of a lithium ion battery. More specifically, the lithium ion battery has the same basic structure as that of the nickel-metal hydride battery except that the raw material, the active material, the electrolyte and so on are different such that a lithium-containing metal compound such as lithium cobalt oxide, lithium nickel oxide, or lithium manganese oxide is used for the positive electrode plate, and a carbon material is used for the negative electrode plate. Therefore, any lithium ion battery employing the structure of the present invention produces less reduction in current collection effect and can limit the resistance value of the battery internal resistance to a small value.

The present invention is effective for use in various kinds of prismatic batteries, in particular, a prismatic battery for driving power supply which is required to have high power.

INDUSTRIAL APPLICABILITY

The present invention is available mainly in manufacturing field of a secondary battery and in fields of manufacture and assembly of part units and members of the secondary battery. The present invention is also applicable to manufacturing field of a primary battery.

What is claimed is:

1. An electrode unit for a prismatic battery comprising an electrode group in which positive electrode plates and negative electrode plates in an almost rectangular shape having four sides are alternately stacked with separators interposed therebetween,
   wherein each of positive electrode plates and negative electrode plates has an active material filled portion in which an active material is filled and core material exposed portions in which the active material is not filled,
   wherein said core material exposed portions are formed on two adjacent side edges of the four sides which are outside the active material in each of said positive electrode plates and negative electrode plates, and
   wherein said positive electrode plates and negative electrode plates are stacked such that the active material filled portions thereof overlap each other in the stack direction while the core material exposed portions thereof are directed not to overlap each other in the stack direction,
   said electrode unit further comprising:
   a positive current collector being in contact along the outside end surfaces of the two adjacent side edges comprising the core material exposed portions in the four side edges of all of the positive electrode plates; and
   a negative current collector having a cross section in an L-shape and being in contact along the outside end surfaces of the two adjacent side edges comprising the core material exposed portions in the four side edges of all of the negative electrode plates, not in contact with said positive current collector.

2. The electrode unit for a prismatic battery according to claim 1, wherein connecting terminal portions protrude from edges or corners of said positive current collector and said negative current collector.

3. The electrode unit for a prismatic battery according to claim 1,
   wherein said positive current collector and said negative current collector are joined to respective core material exposed portions by any of laser beam welding, electron beam welding or resistance heating welding.

4. The electrode unit for a prismatic battery according to claim 1,
   wherein an active material of said positive electrode plate contains nickel hydroxide as a main component, and an active material of said negative electrode plate contains a hydrogen absorbing alloy as a main component.

5. The electrode unit for a prismatic battery according to claim 1,
   wherein an active material of said positive electrode plate contains a lithium-containing metal compound as a main component, and an active material of said negative electrode plate contains a carbon material as a main component.

6. A prismatic battery comprising:
   the electrode unit for a prismatic battery according to claim 1;
   a casing for housing the electrode unit for a prismatic battery;
   a positive electrode terminal electrically connected to a positive current collector of the electrode unit for a prismatic battery and attached to said casing, and
   a negative electrode terminal electrically connected to a negative current collector of the electrode unit for a prismatic battery and attached to said casing.

7. An electrode unit for a prismatic battery comprising an electrode group in which positive electrode plates and negative electrode plates in an almost rectangular shape having four side edges are alternately stacked with separators interposed therebetween,
   wherein each of positive electrode plates and negative electrode plates has an active material filled portion in which an active material is filled and core material exposed portions in which the active material is not filled,
   wherein said core material exposed portions are formed on three adjacent side edges of the four side edges which are outside the active material in each of said positive electrode plates and negative electrode plates, and
   wherein said positive electrode plates and negative electrode plates are stacked such that the active material filled portions thereof overlap each other in the stack direction while the core material exposed portions thereof are directed not to overlap each other in the stack direction,
   said electrode unit further comprising:
   a positive current collector having a cross section in a C-shape and being in contact along the outside end surfaces of the three adjacent side edges comprising the core material exposed portions in the four side edges of all of the positive electrode plates; and
   a negative current collector having a cross section in a C-shape and being in contact along the outside end surfaces of the three adjacent side edges comprising the core material exposed portions in the four side edges of all of the negative electrode plates, not in contact with said positive current collector.

8. The electrode unit for a prismatic battery according to claim 7,
   wherein lengths of the core material exposed portions formed on two side edges located on opposite sides of the three side edges are shorter than respective entire lengths of the two side edges.

9. The electrode unit for a prismatic battery according to claim 7,
   wherein connecting terminal portions protrude from edges or corners of said positive current collector and said negative current collector.

10. The electrode unit for a prismatic battery according to claim 7,
    wherein said positive current collector and said negative current collector are joined to respective core material exposed portions by any of laser beam welding, electron beam welding or resistance heating welding.

11. The electrode unit for a prismatic battery according to claim 7,
    wherein an active material of said positive electrode plate contains nickel hydroxide as a main component, and an active material of said negative electrode plate contains a hydrogen absorbing alloy as a main component.

12. The electrode unit for a prismatic battery according to claim 7,
    wherein an active material of said positive electrode plate contains a lithium-containing metal compound as a main component, and an active material of said negative electrode plate contains a carbon material as a main component.

13. A prismatic battery comprising:
    the electrode unit for a prismatic battery according to claim 7;
    a casing for housing the electrode unit for a prismatic battery;
    a positive electrode terminal electrically connected to a positive current collector of the electrode unit for a prismatic battery and attached to said casing, and
    a negative electrode terminal electrically connected to a negative current collector of the electrode unit for a prismatic battery and attached to said casing.

* * * * *